(12) United States Patent
Sivalingham et al.

(10) Patent No.: US 7,853,560 B1
(45) Date of Patent: Dec. 14, 2010

(54) METHODS FOR ADDRESS BOOK SYNCHRONIZATION AND SUBSCRIPTION STATUS NOTIFICATION

(75) Inventors: Sanjeevan Sivalingham, San Jose, CA (US); Biren Patel, Fremont, CA (US)

(73) Assignee: Cellco Partnership, Basking Ridge, NJ (US)

( * ) Notice: Subject to any disclaimer, the term of this patent is extended or adjusted under 35 U.S.C. 154(b) by 872 days.

(21) Appl. No.: 11/785,128

(22) Filed: Apr. 16, 2007

(51) Int. Cl.
*G06F 17/00* (2006.01)
(52) U.S. Cl. .................. 707/611; 707/612; 707/613
(58) Field of Classification Search .......... 707/611–613
See application file for complete search history.

(56) References Cited

U.S. PATENT DOCUMENTS

| | | | |
|---|---|---|---|
| 6,671,757 B1 | 12/2003 | Multer et al. | |
| 6,694,336 B1 | 2/2004 | Multer et al. | |
| 6,738,789 B2 | 5/2004 | Multer et al. | |
| 6,757,696 B2 | 6/2004 | Multer et al. | |
| 6,925,476 B1 | 8/2005 | Multer et al. | |
| 6,944,651 B2 | 9/2005 | Onyon et al. | |
| 7,007,041 B2 | 2/2006 | Mutler et al. | |
| 7,035,878 B1 | 4/2006 | Mutler et al. | |
| 2005/0044197 A1* | 2/2005 | Lai | 709/223 |
| 2005/0261959 A1* | 11/2005 | Moyer | 705/14 |
| 2006/0156052 A1 | 7/2006 | Bodnar et al. | |
| 2006/0168344 A1 | 7/2006 | Tsuchiya | |
| 2006/0200583 A1 | 9/2006 | Le Lann et al. | |
| 2006/0242210 A1* | 10/2006 | Ring et al. | 707/204 |

* cited by examiner

*Primary Examiner*—Sana Al-Hashemi
(74) *Attorney, Agent, or Firm*—McDermott Will & Emery LLP

(57) ABSTRACT

The various disclosed techniques and equipment relate to synchronizing a subscriber's address books located in a portal and in the subscriber's mobile station, determining the subscription status of a directory number of another party with whom the subscriber intends to communicate, and/or for enabling the subscriber to make a referral to another party who might not be a qualified subscriber.

14 Claims, 8 Drawing Sheets

HIGH LEVEL ARCHITECTURE

First Portal Triggered Address Book Synchronization

FIG. 1 HIGH LEVEL ARCHITECTURE

FIG. 2 Mobile Station Triggered Address Book Synchronization

FIG. 4 First Portal Triggered Address Book Synchronization

FIG. 5 Upload From Personal Computer to Centralized Address Book Database

FIG. 6  Mobile Station Initiated Directory Number Subscription Status Check

FIG. 7 Portal Initiated Directory Number Subscription Status Check

FIG. 8 Referral Offer Transmission

METHODS FOR ADDRESS BOOK SYNCHRONIZATION AND SUBSCRIPTION STATUS NOTIFICATION

TECHNICAL FIELD

The present subject matter relates to mobile communication techniques and equipment for synchronizing address books, determining subscription status of contact directory numbers stored in address books, and processing referrals based on the subscription status of the contact directory numbers.

BACKGROUND

In recent years, the use of mobile stations (or handsets, or cell phones) has dramatically increased. The hardware and the software capabilities of the mobile stations have also dramatically increased. Additionally, the fees associated with communication services have become complex. Two trends are of particular relevance to this discussion.

First, multiple address books may be associated with a single user directory number. A user or subscriber may have a first address book stored in a handset associated with a user directory number, and may have a second distinct address book stored in a first portal associated with the same user directory number. The portal may be adapted to receive pictures or other communications sent to the user directory number. For example, currently Verizon Wireless subscribers may maintain different contact addresses in their handset and their portal accounts (such as Verizon's Vtext and PixPlace). Contact information changes over time, creating a need to synchronize the user's address books in the mobile station and the portal. Although some synchronization methods already exist, however, there is still a need for a technique whereby a subscriber's addresses in these different locations can be synchronized more efficiently for the subscriber and the carrier.

Second, the subscription status of the source destination number and of the target destination number may affect the cost of a communication. If the source destination number and the target destination number both subscribe to the same carrier, then the communication may be free. The term "same carrier" is defined in a broad sense, and carriers that have a joint or mutual benefits agreement for communications between their customers may be classified as "same carrier" for the purpose of communications between their customers. Alternatively, if the source destination number and the target destination number subscribe to different carriers (or different subscription plans), then the communication may be subject to charges based on minutes of usage, and may be subject to additional charges for special features such as short message service (SMS) messages, or for picture communication (MMS), or for video communication.

For example, many carriers offer subscription plans (e.g. Verizon 'IN') such that two subscribers having that plan may make voice calls and exchange SMS/MMS messages at favorable rates. However, currently there is no way for a subscriber to know whether a contact's directory number belongs to the same carrier, and if so, whether the subscriber and the contact qualify for any special rates or benefits for communications between the subscriber and the contact. Hence, a need exists for a technique that enables a subscriber to determine whether a directory number of a calling party or the like belongs to a subscriber of the same carrier and, if so, obtain information about that subscriber's subscription plan, and analyze costs and benefits associated with communications.

This application enables a subscriber to determine whether a directory number of a calling party or the like belongs to a subscriber of the same carrier and, if so, obtain information about that subscriber's subscription plan. Otherwise, the directory number is identified as belonging to a foreign mobile or foreign landline service provider. Furthermore, this application enables the subscription information for directory numbers stored in an address book or contact list of a subscriber to be updated. This subscription information (the carrier and the subscription plan) is referred to as the "subscription status" associated with a directory number. One purpose of tracking the subscription status is in order to notify the user of the costs before a transmission (before the user accepts a transmission, or before a user sends a transmission), or during a transmission, or after a transmission, or before adding a directory number to an address book. The carrier or the handset may expressly calculate and display the cost of a proposed transmission. Additionally, this application enables a subscriber to request that a subscription offer be sent to the directory number of a potential subscriber. The subscription offer, if accepted, may reduce communication costs between the subscriber and the potential subscriber.

Hence various needs exist for methods to synchronize multiple address books, to determine the subscription status of directory numbers in order to learn if transmissions qualify for special ratings, and to process referrals to directory numbers of subscribers.

SUMMARY

The teachings herein alleviate one or more of the above noted problems with the use of mobile stations, and thereby address one or more of the above discussed needs.

In one example, a centralized address book database is used to synchronize and update address books, including updating the subscription status of contacts in the address books. The synchronization and updating of the address books may be initiated in various ways, such as sending a first local database changes query from the centralized address book database to a source mobile station. The source mobile station may respond or answer by transmitting information about at least one contact that was added to or changed in the mobile station address book subsequent to the most recent synchronization. Synchronization may update a subscription status, or a name change, or other information associated with a contact. The contact may be identified by information such as: a directory number, other contact information, or carrier generated identification information. The centralized address book database may send a second local database changes query to the first portal, and may receive a response including information about at least one contact that was added to or changed in the first portal address book subsequent to the most recent synchronization. After receiving responses from the source mobile station and/or from the portal, the centralized address book database may send a subscription status update request to a subscription database, wherein the subscription status update request identifies any contact directory numbers added to the mobile station address book or to the first portal address book subsequent to the most recent synchronization. The subscription database may respond, stating the subscription status of any requested contact directory numbers. The centralized address book database may then send updated information to the mobile station. Note that this updated information preferably includes subscription information for contact directory numbers added to the mobile station address book or to the first portal address book subsequent to the most recent synchronization. Similarly, or simultaneously, the centralized address book database may also send updated information to the portal.

In a second example, a mobile station may check the subscription status of a single directory number. The mobile station may send a directory number subscription status request to a subscription database, and may receive a subscription status in response. The mobile station may display the directory number status in order to facilitate a mobile station user's decision to accept a transmission, send a transmission, or store a directory number. SMS (short message service) may be used by the mobile station, because current communication systems allow SMS transmissions simultaneously with a voice call. Thus, updating and synchronization may be performed in the background of a voice call, and invisible to a user of the mobile station. Further, a subscription status check may be performed simultaneously (and invisibly) with a transmission, and the subscription status information and even the total cost may be presented upon termination of the transmission. Alternatively, a running cost (similar to a subtotal) may be presented during the transmission to the user, constantly informing the user of the actual costs as they are incurred. However, a subscription status check of a proposed transmission (accept or send) may preferably be performed before the proposed transmission is accepted or sent, so that the user is aware of the potential costs of the proposed transmission.

In a third example, a source mobile station may request that a subscription offer be sent to a target directory number. Specifically, the source mobile station may send a referral request to a subscription database. The subscription database may determine the target subscription status of the target directory number, and then determine whether the target directory number is eligible for a referral offer, based at least in part upon the user subscription status and the target subscription status. Upon a determination that the target directory number is eligible, the subscription database may send a referral offer to the target directory number. If, upon a determination that the target directory number is not eligible then, the subscription database may not send a referral offer to the target directory number. Alternatively, the mobile station may send a referral offer directly to the target directory number without involving the subscription database for example based on subscription information currently available at the mobile station. More broadly, the referral offer may be sent via an entity in the carrier's network or hosted by another party on behalf of the carrier, and the entity may be the subscription database, the centralized address database, the centralized address book, or some other entity that has access to information needed to perform referral offer processing.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various techniques and equipment disclosed herein relate to synchronizing a subscriber's address books located in a portal and in the subscriber's mobile station, determining the subscription status of a directory number of another party with whom the subscriber intends to communicate, and/or enabling the user to make a referral to another party who might not be a qualified subscriber.

This application enables a subscriber to determine whether a directory number of a calling party or the like belongs to a subscriber of the same carrier and, if so, obtain information about that subscriber's subscription plan. Otherwise, the directory number is identified as belonging to a foreign mobile or foreign landline service provider. Furthermore, this application enables the subscription information for directory numbers stored in an address book or contact list of a subscriber to be updated. This subscription information (the carrier and the subscription plan) is referred to as the "subscription status" associated with a directory number. One purpose of tracking the subscription status is in order to notify the user of the costs before a transmission (before the user accepts a transmission, or before a user sends a transmission), or during a transmission, or after a transmission, or before adding a directory number to an address book. The carrier or the handset may expressly calculate and display the cost of a proposed transmission. Additionally, this application enables a subscriber to request that a subscription offer be sent to the directory number of a potential subscriber.

Reference now is made in detail to the examples illustrated in the accompanying drawings and discussed below.

Figure 1:
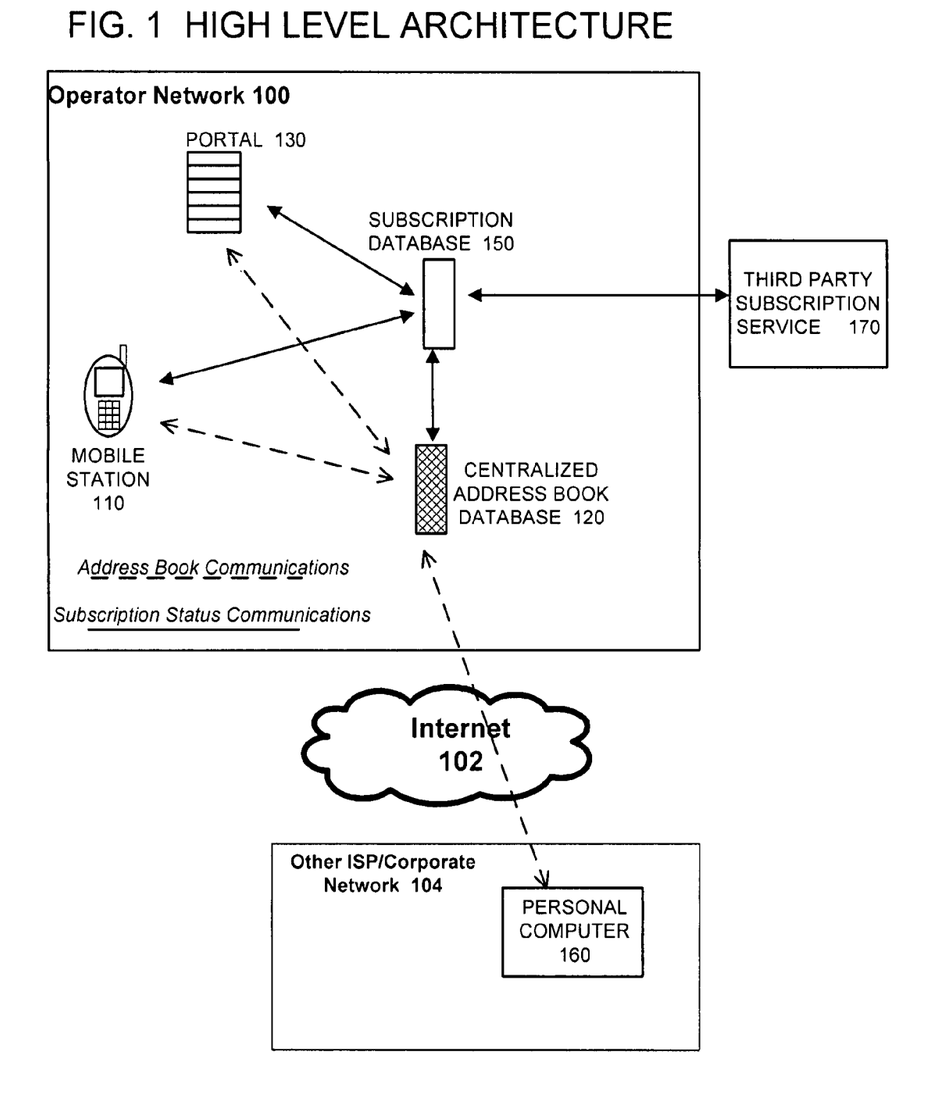
FIG. 1 illustrates an example of the hardware and communication paths that may participate in synchronizing address books and updating subscription status.

FIG. 1 illustrates an example of the hardware and communication paths that may participate in synchronizing address books and updating subscription status. The dashed arrows in FIG. 1 indicate operations and communications related to synchronizing address books containing directory numbers and subscription status. The solid arrows in FIG. 1 indicate operations and communications related to checking or updating the subscription status of directory numbers. These operations and communications will be described in more detail in FIGS. 2-8.

Broadly, FIG. 1 illustrates an operator network 100, an Internet 102, an ISP/corporate network 104, and a third party subscription service 170. The operator network 100 comprises, and provides communication among: a mobile station 110, a centralized address book database 120, a portal 130, and a subscription database 150. The ISP/corporate network 104 includes a personal computer 160. Some exemplary address book communications (dashed lines) and subscription status communications are illustrated among the entities.

The mobile station 110 may be a cellular phone, or wireless personal digital assistant, or similar device. The mobile station 110 is often called a "handset" for convenience. This application uses the terms "mobile station" and "handset" to broadly include communication devices affixed to cars, or other devices using mobile or cellular or wireless communication networks. A user (or subscriber) may subscribe to a selected subscription plan from a carrier or a wireless communication operator for communications with the handset. The handset may store a first address book including directory numbers, names, and subscription status. Conventionally the handset address book is merely backed up to a network server, and is not synchronized with a distinct address book on a portal as disclosed by this application. The handset may contain software for: address book synchronization, storing and processing subscription status information, and sending referral offers.

The portal 130 may comprise one or more servers supporting a web site such as Verizon's "www.vtext.com," which is used for text messages. The term "server" is intended to broadly represent a general class of data processing device commonly used to run "server" programming. Such devices typically utilize general purpose computer hardware to perform server processing and to perform attendant communications via the network(s). The server, for example, may include a data communication interface for packet data communication. The server may include a central processing unit (CPU) in the form of one or more processors, for executing program instructions. The server may include program storage and data storage for various data files to be processed and/or communicated. The hardware elements, operating systems, and programming languages of such servers are conventional in nature, and it is presumed that those skilled in the art are adequately familiar therewith.

The portal may have an associated second address book. There may be a first portal associated with a first web site, and a second portal associated with a second web site. The second portal may support a second web site such as "www.vzw.pix.com," which is used for picture messages. The two portals may be supported by the same one or more servers. Each portal may store a distinct address book, or two portals may share a single address book. A portal address book may be distinct from the handset address book, and may have a capacity for a larger number of addresses than the handset address book. The portal may maintain a mirror contact address book database that is synchronized with the centralized address book database or alternatively the portal may simply query a centralized contact address book 120 for contact information (e.g. via HTTP, or HTTPS).

A centralized address book database 120 may comprise one or more servers storing and managing a user's centralized address book. The centralized address book may be used for synchronization, as will be discussed below. The centralized address book may also serve as a back up for the handset address book.

The centralized address book database 130 may group contacts in two distinct groups: a main group, and a mobile group. The main group and the mobile group may be related in various ways, including, but not limited to: a) the mobile group may be a subset of the main group (the most efficient relationship in many ways, and is preferred), b) a supergroup may comprise all contacts in either group, and each contact may be associated with one or more groups, and c) the main group and the mobile group may be kept separate as distinct groups (distinct groups may require duplicate entries, and thus are not preferred). The mobile group may be limited in size so that it does not exceed the storage capacity of the user's handset, which currently is 300 contacts for most handsets. The centralized address book database may obtain handset storage capacity information directly from the handset or from the subscription database. Furthermore the combined size of main group and the mobile group may also be limited to a larger size, which is currently 500 contacts for some portals. The contacts in the mobile group may be synchronized with the handset and the portal while the contacts in the main group may be synchronized with the portal only. However, preferably all contacts available on the mobile group will also be available on any portal groups, and any updates to any mobile group contact will be synchronized with any portal groups. Thus, a portal group may be equivalent to the main group or may be a subset of the main group, and the mobile group may be a subset of the portal group.

The subscriber may use "drag & drop" techniques to select and change a contact from the mobile group to the main group or vise-versa. By default, new contacts added via the portal address book may be added to the mobile group until its limit is reached, in which case the new contacts may be put into the main group which may hold overflow from the mobile group.

Alternatively, the small or mobile or handset book may be operated as a subset of the main book. The user may manually select which contacts of the main book will be treated as a mobile book. Alternatively, the carrier may provide one or more automatic selection procedures. For example, the 300 most recent entries may be selected as the mobile book.

As another example, a multi-variable optimization algorithm may select 300 entries for the handset book as a function of variables such as: how recent was the directory number entered, subscription status (cost), frequency of usage, and dates of usage. Thus, a directory number that was being called every day with no cost probably be automatically selected for the mobile group.

A subscription database 150 may comprise one or more servers storing and managing a large database of directory numbers and subscription status associated with subscribers to the same carrier as the user of the handset. Subscribers to the same carrier may be described as "in-network." Additionally, the subscription database may store directory numbers and subscription status associated with subscribers of other carriers.

The subscription database 150 and the centralized address book database 120 may be implemented as separate physical databases or may be implemented as one physical database. The two databases could be implemented using a relational database model or other database models. The two databases may be implemented as stand-alone databases or may be built on databases that are used within a web-portal. The two databases may be maintained within the carrier's network or hosted in an external entity on behalf of the carrier.

A third party subscription service 170, such as NeuStar, may provide subscription status information for destination numbers that are not "in-network." The third party service may charge a fee for providing subscription status information for "out-of-network" subscribers. Alternatively, less costly exchange or cooperative agreements may be made directly with at least some of other carriers, in order to reduce the cost of third party services.

The subscription database 150 may store this subscription status information to reuse or recycle for address books of different subscribers without repeatedly incurring third party service fees for the same directory number. The subscription database may associate a download date with this subscription status information, and reuse the information for perhaps one week while the information is fresh, and perhaps delete the old or expired data after one week of usage.

Another possibility is to simply designate all destination numbers that are not "in-network" as foreign or "out-of-network," and not spend any additional time or energy or expense attempting to identify their specific carrier.

A desktop personal computer 160 or laptop may be used by the subscriber to access the centralized address book database 150 or the portal 130 through the Internet. Typically the personal computer may contain yet another address book or contact list.

Figure 2:
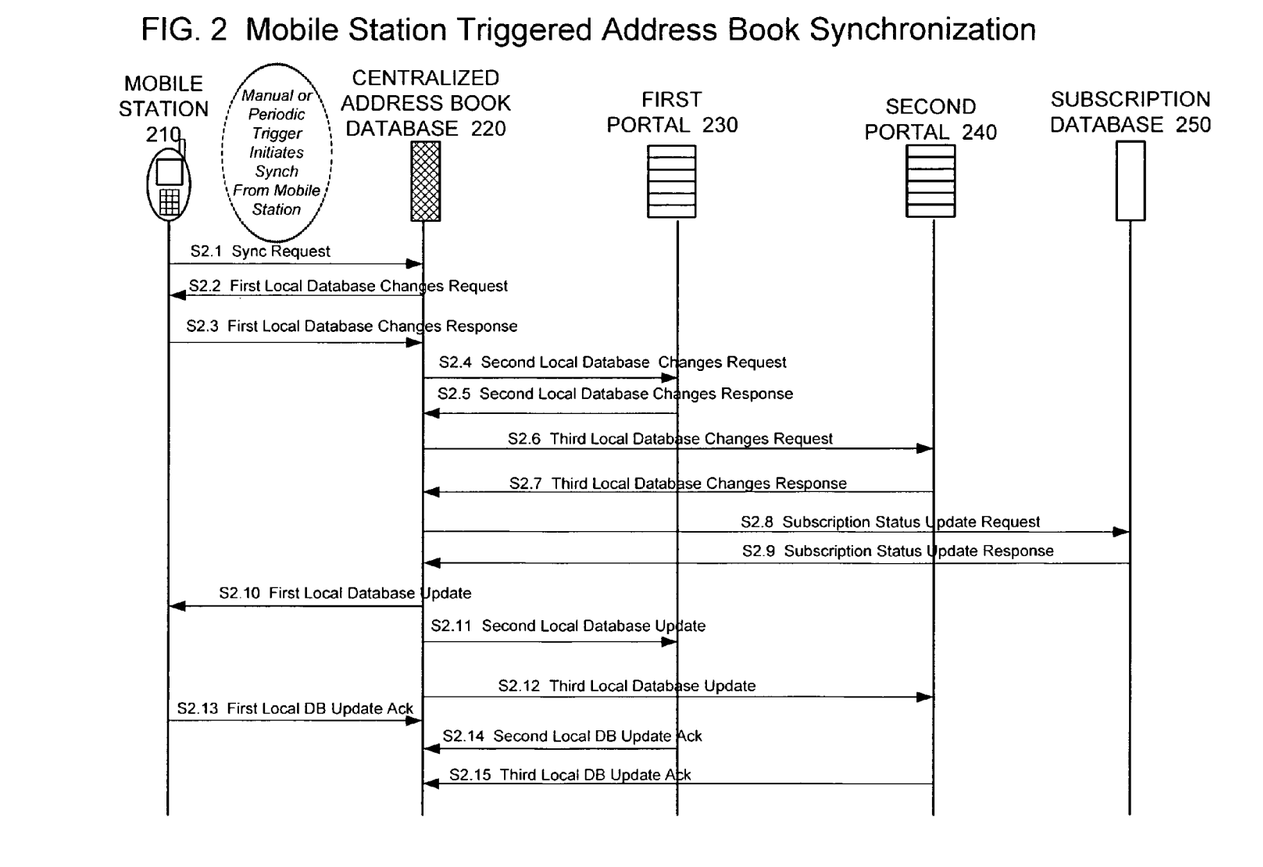
FIG. 2 is a call or signal flow diagram illustrating an exemplary series of communications for synchronization triggered from a handset.

FIG. 2 illustrates an exemplary series of communications for synchronization triggered from a handset. A mobile station 210, a centralized address book database 220, a first portal 230, a second portal 240, and a subscription database 250 may participate in the synchronization. The arrows represent transmissions, or functional operation call flows, or steps. For example, the top left arrow is labeled "S2.1 Sync Request," and is a transmission from mobile station 210 to centralized address book 220.

In step S2.1, mobile station 210 sends a synchronization request to centralized address book database 220. Mobile station 210 may manually trigger or automatically trigger the address book synchronization.

In step S2.2, centralized address book database 220 sends a first local database changes request to mobile station 210. The centralized address book database 220 requests all changes or "deltas" that were made to the handset address book since the most recent synchronization. Alternatively, the centralized address book database 220 requests the complete handset address book, but this alternative is a relatively inefficient use of limited bandwidth.

In step S2.3, mobile station 210 sends a first local database changes response to centralized address book database 220. This response includes all changes or "deltas" that were made to the handset address book since the most recent synchronization.

Alternatively, step S2.1 may simultaneously request synchronization and also preemptively report local database changes, and thus steps S2.2 and S2.3 may be omitted.

In step S2.4, centralized address book database 220 sends a second local database changes request to first portal 230. The centralized address book database 220 requests all changes or "deltas" that were made to the first portal address book since the most recent synchronization.

In step S2.5, first portal 230 sends a second local database changes response to centralized address book database 220. This response includes all changes or "deltas" that were made to the first portal address book since the most recent synchronization.

In step S2.6, centralized address book database 220 sends a third local database changes request to second portal 240. The centralized address book database 220 requests all changes or "deltas" that were made to the second portal address book since the most recent synchronization.

In step S2.7, second portal 240 sends a third local database changes response to centralized address book database 220. This response includes all changes or "deltas" that were made to the second portal address book since the most recent synchronization. Additional handsets or portals or personal computers (not shown) may be similarly queried for changes and synchronized.

In step S2.8, centralized address book database 220 sends a subscription status update request to subscription database 250. This request queries the subscription status for all new directory numbers, and existing directory numbers (since subscription status for existing numbers may have changed since the last update). Alternatively, the status update request may include existing directory numbers only if these have not been queried for some predetermined length of time, such as one week or one month). The subscription status of directory numbers may change, so it is preferable to update the status by frequently querying existing directory numbers as well. Existing contacts (particularly from the same carrier) will preferably be queried with each synchronization to ensure that the user has the most up-to-date information and does not make or receive calls under outdated information that the other party is 'in-network' when the other party is not.

In step S2.9, subscription database 250 sends a subscription status update response to centralized address book database 220. The subscription database 250 may be limited to storing the subscription status of directory numbers subscribing to the same carrier as the handset (in-network). The subscription database may also query a third party for the subscription status of out-of-network directory numbers, or may merely designate these as out-of-network or foreign. The subscription database may store or cache information received from a third party (not shown) regarding the subscription status of out-of-network directory numbers, and may reuse or recycle this cached information for additional queries from other subscribers for a limited period of time (perhaps a week) in order to reduce usage fees paid to the third party. Subscription database may also store mobile device capability information (e.g. mobile address book contact storage capacity) for 'in-network' mobile directory numbers.

If the centralized address book database and the subscription database are implemented as a single physical database then steps S2.8 and S2.9 would occur internally in the single physical database. The single physical database may be a relational database including all of the carrier's directory numbers, some out-of-network directory numbers (cached), subscription status of all the stored directory numbers, and identification of which directory numbers belonged to which address books. A single relational database is well suited to this type of use, but may be more susceptible to attack or corruption than a subscription database that is physically separated and fire-walled.

In step S2.10, centralized address book database 220 sends a first local database update to mobile station 210. This update may contain address information from new entries to the first portal and second portal, and may contain subscription status information for all new entries and for all entries that have not been recently updated. Additionally, the local database update to the mobile station 210 may also be used to enable or disable or schedule the next handset initiated automatic synchronization, or to change the method of automatic synchronization.

In step S2.11, centralized address book database 220 sends a second local database update to first portal 230. This update may contain address information from new entries to the handset and the second portal, and may contain subscription status information for all new entries and for all entries that have not been recently updated.

In step S2.12, centralized address book database 220 sends a third local database update to second portal 240. This update may contain address information from new entries to the handset and the first portal, and may contain subscription status information for all new entries and for all entries that have not been recently updated.

Steps S2.13, S2.14, and S2.15 are local database update acknowledgments from the handset, first portal, and second portal respectively. These acknowledgements are merely standard "housekeeping" or "handshaking" communications which acknowledge that the local databases have been updated and the synchronization is complete.

The transmissions to and from the handset (steps S2.1, S2.2, S2.3, S2.10, and S2.13) may be performed using SMS. In this fashion, the SMS may operate invisibly in the background, and voice communications may operate simultaneously. Alternatively, these transmissions may use packet protocols for data transfer, such as 1×RTT or EVDO. The bearer (SMS or packet) used could be fixed or dynamically selected based on whether a voice call is on-going when steps S2.1, S2.2, S2.3, S2.10, and S2.13 occur.

Figure 3:
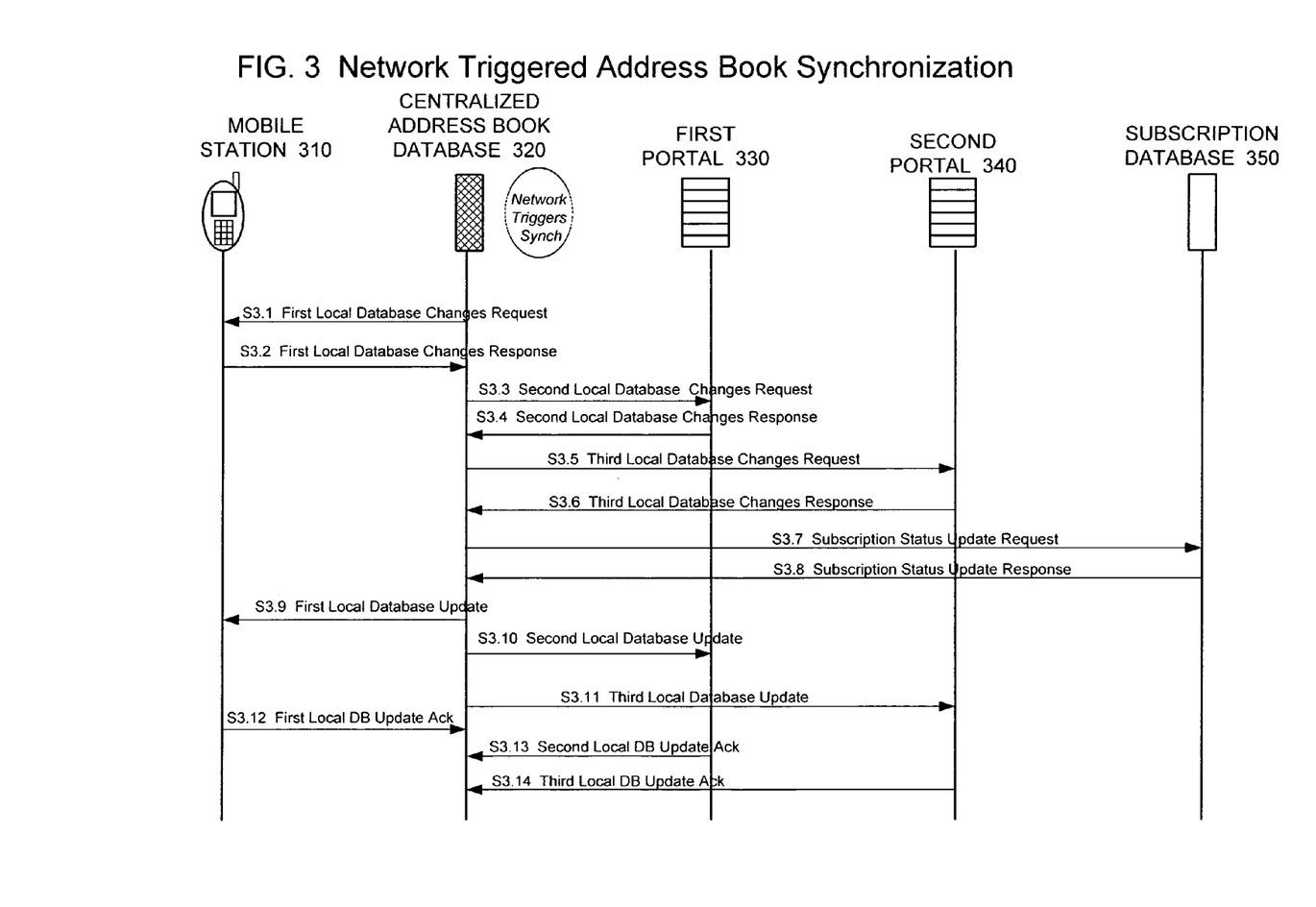
FIG. 3 is a call or signal flow diagram illustrating an exemplary series of communications for synchronization triggered from a centralized address book database.

Further, note that many of the steps in FIG. 2 (and in FIGS. 3-8) may be performed in different order, or simultaneously, or even omitted. For example, all of the local database changes requests may be sent simultaneously. Alternatively, all of the local database changes requests may be omitted, and the mobile station 210 and portals 230 and 240 may periodically or continuously send local database changes to the centralized address book database 220. Similarly, the update acknowledgements may be omitted, although this type of acknowledgement is considered good practice as it assures the centralized address book database that changes sent in the update have been received by the mobile/portals and hence no longer need to be tracked at the database FIG. 3 illustrates an exemplary series of communications for synchronization triggered from a centralized address book database 320. FIG. 3 differs from FIG. 2 only regarding the method of triggering. In FIG. 3, the centralized address book database 320 triggers or initiates the synchronization periodically, or according to a schedule, or upon manual command. For example, synchronization may be triggered automatically once per week. Alternatively, synchronization may be triggered during the first voice call which occurs at least one week after the most recent synchronization. Synchronization during a voice call may be carried out using SMS in the background, without disturbing the voice call.

Steps S3.1 to S3.14 of FIG. 3 correspond respectively to steps S2.2 to S2.15 of FIG. 2.

As discussed above, note that under some conditions steps may be omitted or rearranged. For example, regarding FIG. 3, if there are no changes to any of the local databases and if none of the subscription status data is expired (too old), then there is no need for a subscription status update request (step S3.7), and no need for a subscription status update response (step S3.8).

Additionally, the local database update communication to the mobile station 210 (step S3.9) may also be used to enable or disable or schedule the next handset initiated periodic synchronization, or to change the method of periodic synchronization.

Figure 4:
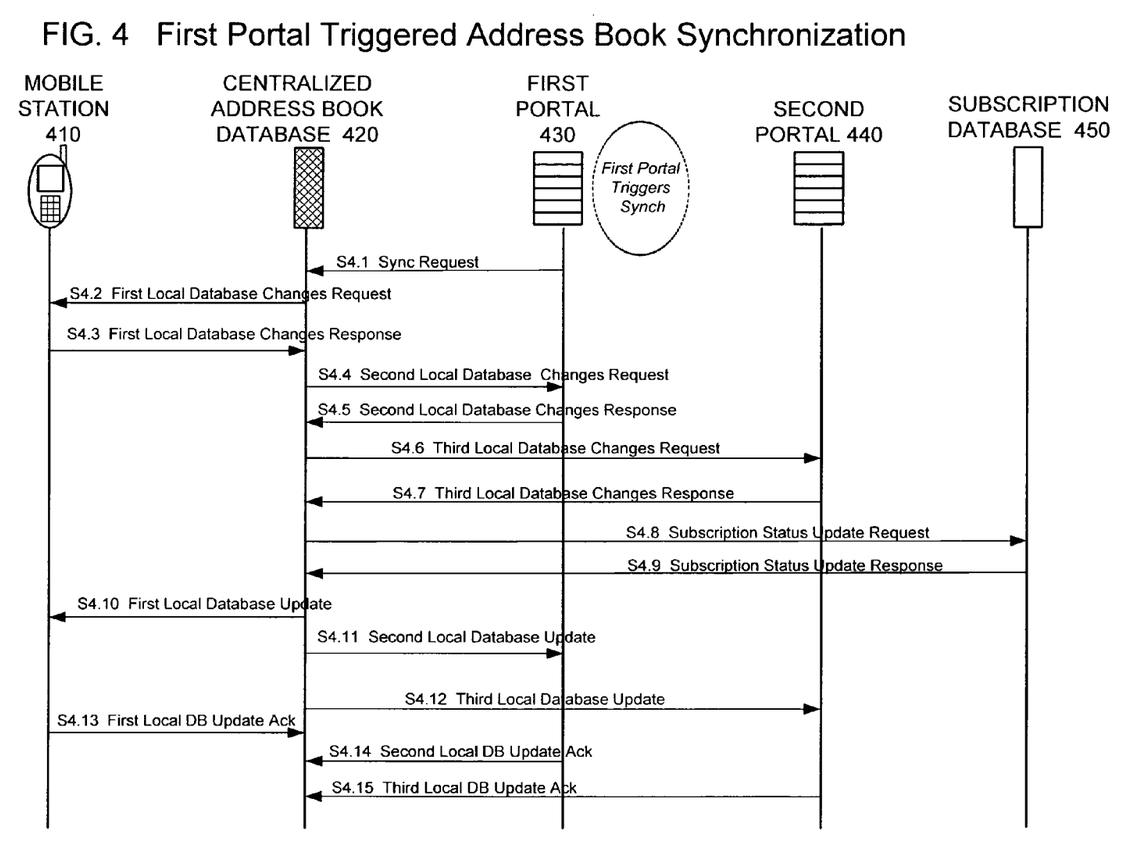
FIG. 4 is a call or signal flow diagram illustrating an exemplary series of communications for synchronization triggered from a first portal.

FIG. 4 illustrates an exemplary series of communications for synchronization triggered from a first portal 430. The subscriber may log-in to a carrier operated first portal 430 and manually initiate an address book synchronization, perhaps after adding a directory number to the first portal address book.

Steps S4.1 to S4.15 in FIG. 4 are similar to steps S2.1 to S14 in FIG. 2, except that FIG. 4 is initiated from the first portal 430 instead of from the mobile station 210. Alternatively, but not shown, the synchronization request may be initiated from the second portal 440, or from a second handset, or from a personal computer.

Figure 5:
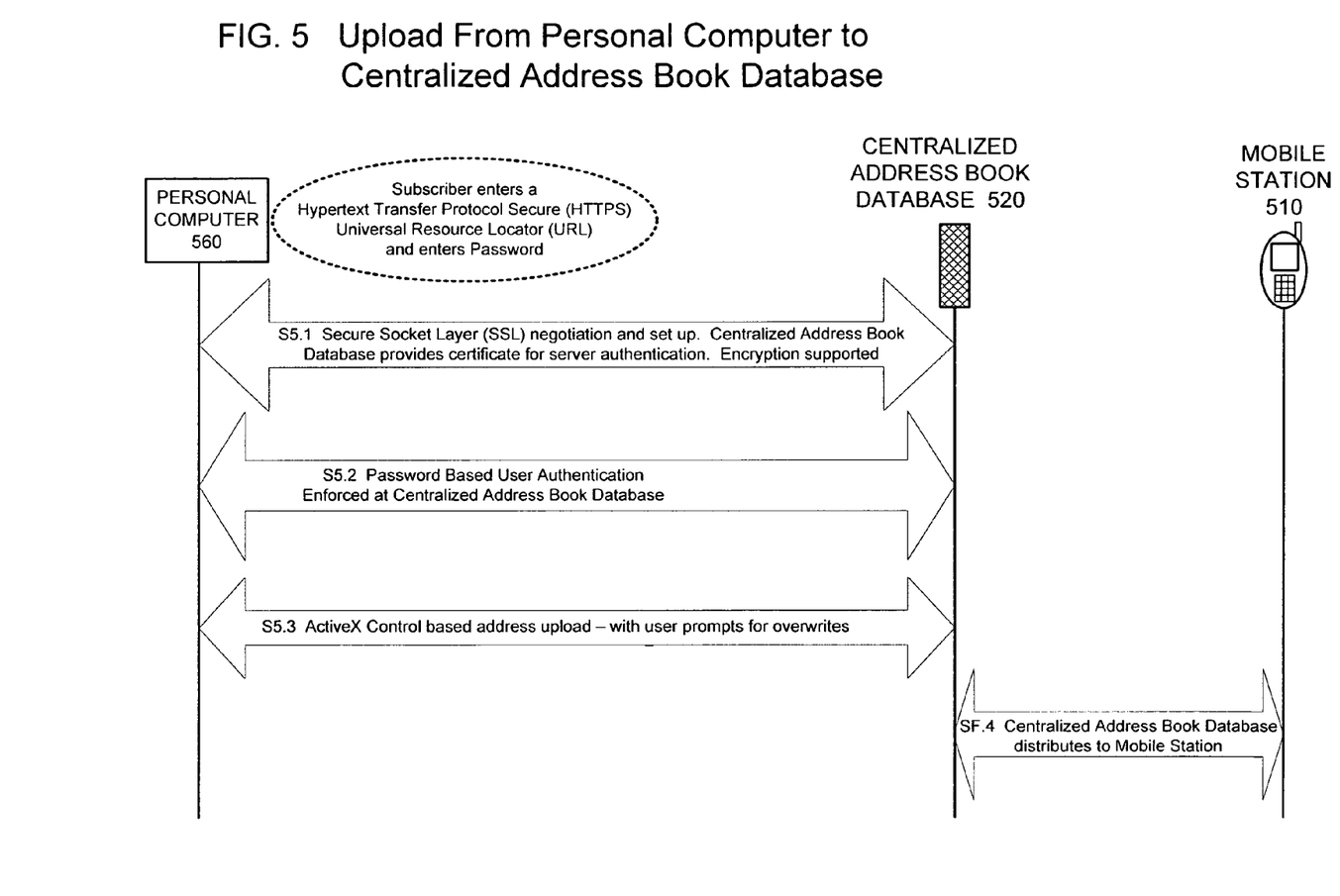
FIG. 5 is a call or signal flow diagram illustrating an exemplary series of communications for synchronization triggered from a personal computer.

FIG. 5 illustrates an exemplary series of communications for synchronization triggered from personal computer 560. A subscriber may enter an advertised HTTPS URL associated with his carrier by using the personal computer 560. HTTPS is an acronym for Hypertext Transfer Protocol Secure, which is a server protocol for secure transactions on the world wide web. URL is an acronym for Universal Resource Locator, which effectively is an Internet address.

In step S5.1, personal computer 560 may perform security handshaking with centralized address book database 520. For example, SSL (Secure Socket Layer transport level technology for authentication and data encryption between a web server and a web browser) may be used for negotiation and setup of communications. The centralized address book database may provide a certificate for server authentication, and encryption may be supported.

In step S5.2, centralized address book database may perform password based user identification of the user accessing personal computer 560. In other words, personal computer 560 submits a password to centralized address book database 520 for authentication.

In step S5.3, personal computer 560 may use control protocols, such as ActiveX Control, to upload or synchronize contact information from an address book on the computer to the centralized address book database 520.

In step S5.4, centralized address book database 520 synchronizes with other entities (mobile station 510, first portal, second portal, and subscription database) as previously shown in FIG. 3, steps S3.1 to S3.15. Additionally, local database updates may be sent to the personal computer 560.

Figure 6:
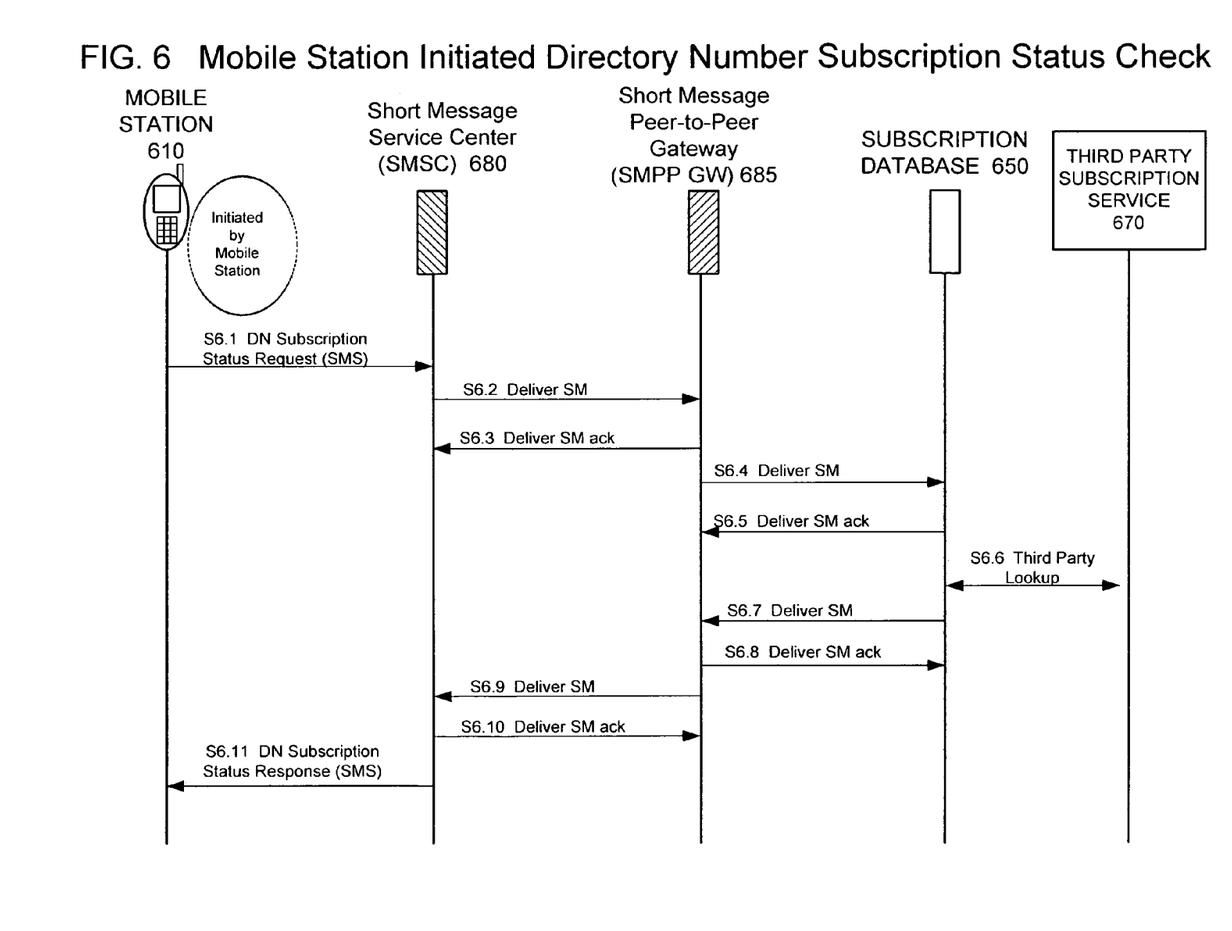
FIG. 6 is a call or signal flow diagram illustrating an exemplary series of communications for a handset initiated subscription status check.

FIG. 6 illustrates an exemplary series of communications for mobile station 610 initiating a subscription status check for a single directory number involving: mobile station 610, an Short Message Service Center (SMSC) 680, a Short Message Peer-to-Peer Gateway (SMPP GW) 685, a Subscription Database 650, and a third party information subscription service 670.

The subscription status check may be triggered by mobile station 610 when: a) sending a voice call (MO or mobile originated); b) receiving a voice call (MO or mobile terminated); c) sending or receiving an EMS (Extended Message Service) or SMS (Short Message Service) or MMS (Multi-Media Service) message; d) adding a directory number to the handset address book; or e) expressly requesting the subscription status of a destination number, and the directory number is new (not in the handset address book) or the subscription status has not been updated recently.

The mobile station 610 may trigger the subscription status check during a voice call by using SMS, or alternatively may use packet data based transport. Additionally, mobile station 610 may prompt (suggest) the user to trigger the subscription status check before accepting or sending a transmission, or before adding a directory number to the handset address book. Alternatively, the handset may automatically perform the subscription status check while allowing the user to accept or send or add.

At step S6.1, mobile station 610 sends a directory number subscription status request using short message service (SMS) to the Short Message Service Center (SMSC) 680.

At step S6.2, Short Message Service Center (SMSC) 680 sends or delivers or forwards the directory number subscription status request to Short Message Peer-to-Peer Gateway (SMPP GW) 685.

At step S6.3, Short Message Peer-to-Peer Gateway (SMPP GW) 685 may send an acknowledgement to Short Message Service Center (SMSC) 680. This acknowledgement is typical good practice communications protocol to verify that a message (step S6.2) has been delivered without any problems. Thus, this acknowledgement is not critical to the subscription status check.

At step S6.4, Short Message Peer-to-Peer Gateway (SMPP GW) 685 sends or delivers or forwards the directory number subscription status request to subscription database 650. If the directory number being checked (contact directory number) is associated with the same carrier as the directory number of the mobile station 610 (user directory number), then the subscription database knows that the contact directory number is "in-network." If the directory number is "out-of-network," then the subscription database may simply classify the subscription status as "out-of-network," or may communicate with a third party subscription service 670 (such as NeuStar) to obtain a more detailed subscription status of the directory number.

Alternatively, the subscription database 650 may cache recent subscription status data recently obtained for out-of-network destination numbers, and may search this recent data before communication with third party subscription service 670.

Step S6.5 is an acknowledgment, similar to step S6.3.

In step S6.6, the subscription database 650 may communicate with third party subscription service 670 in order to learn additional information about the subscription status of "out-of-network" directory numbers. This communication may include a subscription status request from the subscription database 650 to the third party subscription service 670, and a response from the third party subscription service 670 to the subscription database 650. For example, the third party may be the commercial firm NeuStar.

Alternatively (for simplicity and speed), the subscription database 650 may be omitted, and the third party subscription service 670 may directly provide subscription status information for all subscription status requests.

In step S6.7, subscription database 650 sends subscription status information to Short Message Peer-to-Peer Gateway (SMPP GW) 685.

Step S6.8 is an acknowledgment, similar to step S6.3.

In step S6.9, Short Message Peer-to-Peer Gateway (SMPP GW) 685 sends subscription status information to Short Message Service Center (SMSC) 680.

Step S6.10 is an acknowledgment, similar to step S6.3.

In step S6.11, Short Message Service Center (SMSC) 680 sends a directory number subscription status response using SMS to mobile station 610. Thus, the response from step S6.11 is the response to the request from step S6.1. Step S6.11 may be followed by an acknowledgement, not shown.

Upon receiving the subscription status response, the mobile station 610 may: a) display the subscription status; or b) store the subscription status; or c) prompt the user to c1) accept a message or c2) send a message or c3) add a directory number to the mobile directory address book based on the subscription status response.

Figure 7:
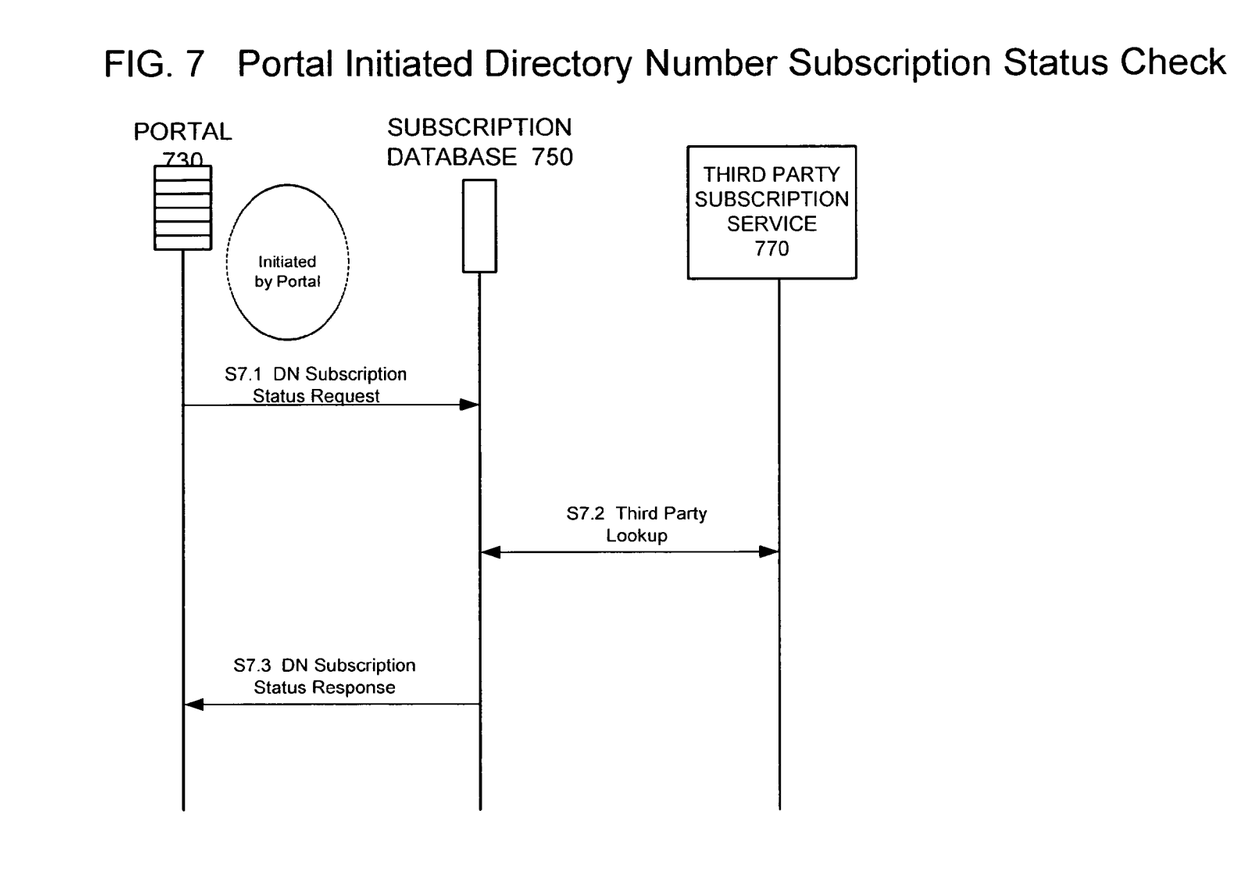
FIG. 7 is a call or signal flow diagram illustrating an exemplary series of communications for a portal initiated subscription status check.

FIG. 7 illustrates an exemplary series of communications for a portal initiated subscription status check. This series of communications is similar to those of FIG. 6, except that the communications are preferably made using data packets through the Internet, and not using SMS. The subscription status check may be triggered by the portal when: a) sending or receiving an EMS (Extended Message Service) or SMS (Short Message Service) or MMS (Multi-Media Service) message and the directory number is new (not in the portal address book); b) adding a directory number to the portal address book; or c) expressly requesting the subscription status of a destination number, and the destination number is new (not in the portal address book).

In step S7.1, portal 730 sends a directory number subscription status request to subscription database 750. As discussed above in FIG. 6, if the directory number is associated with the same carrier as the handset (in-network), then the subscription database already has the subscription status. If the directory number is out-of-network, then the subscription database may simply classify the subscription status as "out-of-network," or may communicate with a third party information provider such as NeuStar to obtain the subscription status of the directory number.

In step S7.2, the subscription database 750 may communicate with third party subscription service 770 in order to learn additional information about the subscription status of "out-of-network" directory numbers. This communication may include a subscription status request from the subscription database 750 to the third party subscription service 770, and a response from the third party subscription service 770 to the subscription database 750. For example, the third party may be the commercial firm NeuStar.

Alternatively (for simplicity and speed), the subscription database 750 may be omitted, and the third party subscription service 770 may directly provide subscription status information for all subscription status requests.

In step S7.3, the subscription database 750 sends a directory number subscription status response to portal 730. Thus, the response from step S7.3 is the response to the request from step S7.1. Step S7.3 may be followed by an acknowledgement, not shown.

Upon receiving the subscription status response, the portal 730 may: a) display the subscription status; or b) store the subscription status; or c) prompt the user to c1) accept a message or c2) send a message or c3) add a directory number to the portal address book based on the subscription status response.

Figure 8:
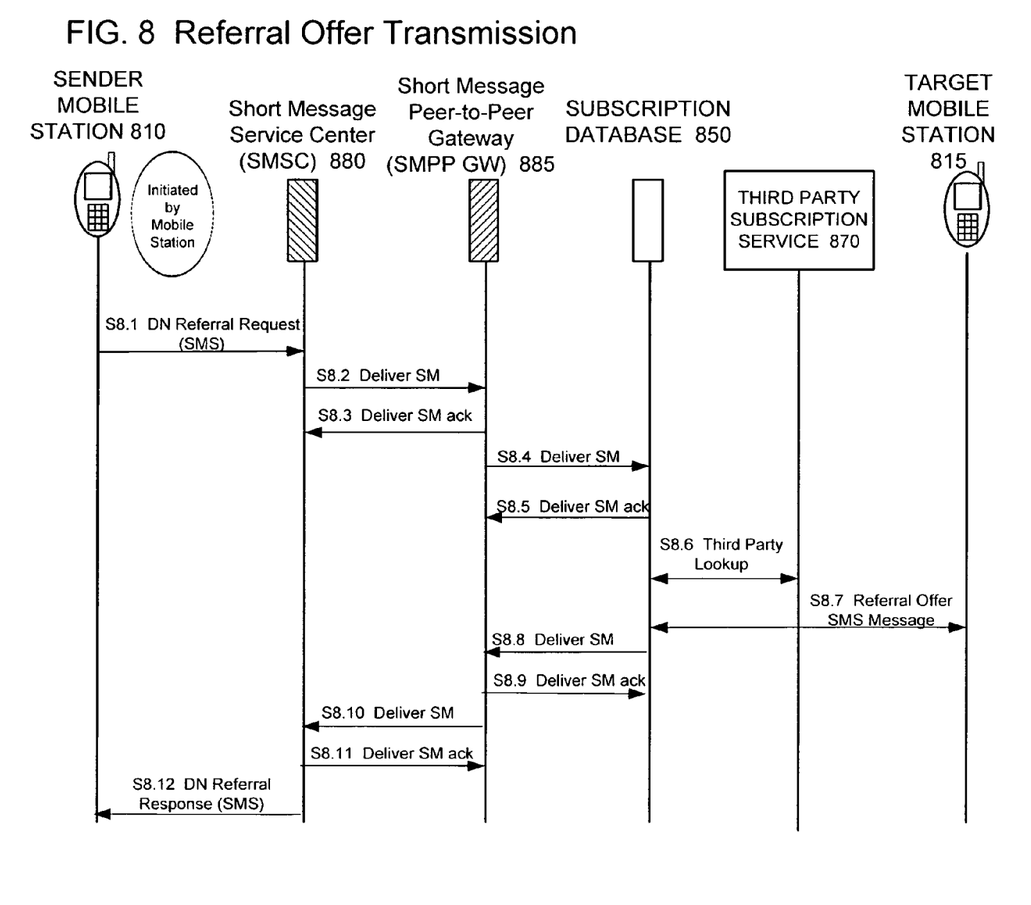
FIG. 8 is a call or signal flow diagram illustrating an exemplary series of communications for sending a referral offer.

FIG. 8 illustrates an exemplary series of communications for sending a referral offer. Triggering or initiation occurs when a mobile station user selects a destination number as a target for a referral.

For example, a referral offer procedure may allow a Verizon subscriber to send (directly or indirectly) an SMS message to a friend (a target directory number) to notify the target about some Verizon subscription plan, and invite the target to join. The sender mobile station 810 may use the subscription status of the target available in the sender mobile station address book to allow or disallow sending of a referral offer or other special message to a particular contact directory number. In one case, the sender mobile station may only allow a referral request to be sent to a target that is not a Verizon subscriber, and only to a mobile directory number (not to a landline directory number).

Additionally, or alternatively, the referral request may be screened and modified by an entity in the carrier's network or hosted by another party on behalf of the carrier before it is sent to target, so that carrier related information to be included in the message (e.g. details to contact the carrier or any promotion details) may be generated and easily updated by the carrier. Alternatively, the mobile station itself may generate some or all of the carrier related information, but in this case the carrier must update all mobile stations whenever there are changes to the carrier related information. In the case where the mobile station generates carrier related information, the referral offer may be sent directly to the target without passing entity in career's network (e.g. for screening or message update). However, mobile would be required to perform any screening. Alternatively, referral offer may pass through an entity in carrier's network for screening even when mobile generates carrier related information.

In step S8.1, sender mobile station 810 sends a directory number referral request using SMS protocols to Short Message Service Center (SMSC) 880. Alternatively, the request may be sent using MMS (Multimedia Message Service) protocols.

In step S8.2, Short Message Service Center (SMSC) 880 sends the directory number referral request to Short Message Peer-to-Peer Gateway (SMPP GW) 885.

Step S8.3 is an acknowledgement.

In step S8.4, Short Message Peer-to-Peer Gateway (SMPP GW) 885 sends the directory referral request to subscription database 850. The subscription database may be an ESME (External Short Messaging Entity). If the target directory number is associated with the same carrier as the sender mobile station (in-network), then the subscription database 850 already has the subscription status. If the directory number is out-of-network, then the subscription database may simply classify the subscription status as "out-of-network," or may communicate with a third party subscription service 870 such as NeuStar to obtain the subscription status of the directory number. Alternatively, the subscription database 850 may store recent subscription status data obtained for out-of-network destination numbers, and may search this recent data before communication with a third party subscription service 870 to obtain the subscription status of the directory number.

Step S8.5 is an acknowledgement.

In step S8.6, the subscription database 850 may communicate with third party subscription service 870 in order to learn additional information about the subscription status of "out-of-network" directory numbers. This communication may include a subscription status request from the subscription database 850 to the third party subscription service 870, and a response from the third party subscription service 870 to the subscription database 850. For example, the third party may be the commercial firm NeuStar.

Alternatively (for simplicity and speed), the subscription database 850 may be omitted, and the third party subscription service 870 may directly provide subscription status information for all subscription status requests.

In step S8.7, the subscription database 850 may send a referral offer to target mobile station 815. The subscription database 850, or a carrier employee, makes a decision regarding whether to send a referral offer to the referred or target directory number. This decision may be based on factors such as: a) the subscription status of the target directory number, b) the period of time that has passed since the most recent offer to the target directory number, and c) the presence of the target directory number on a no-call list. Additionally, the type of referral offer may depend upon factors such as: a) the present subscription status of the target directory number and of the referring or source directory number, b) the historical pattern of communications between the target directory number and the source directory number, c) any information or suggestions provided by the user, and d) the availability of various promotional specials.

The offer may be an SMS message, or an MMS message, or a simple voice message. Further, text or voice or pictures or video provided by the user in the referral request may be attached to or embedded in the offer. The offer may be customized to emphasize benefits associated with communications between the sender mobile station 810 and target mobile station 815.

In step S8.8, the subscription database 850 sends a directory number referral response to Short Message Peer-to-Peer Gateway (SMPP GW) 885. This response may merely state that a referral offer was sent (or was not sent) to the target mobile station 815. This response may include a copy of the referral offer. This response may award some benefits to the sender mobile station, such as a free ring tone. Other benefits may be awarded after the target mobile station subscribes to the same carrier as the sender mobile station. This response may be an SMS message. This response is optional, and is merely provided to encourage or reward sender mobile station 810.

Step S8.9 is an acknowledgement.

In step S8.10, Short Message Peer-to-Peer Gateway (SMPP GW) 885 sends the referral response to Short Message Service Center (SMSC) 880.

Step S8.11 is an acknowledgement.

In step S8.12, Short Message Service Center (SMSC) 880 sends the directory number referral response to sender mobile station 810.

There are many alternatives (and combinations of alternatives) for triggering synchronization—some require manual user intervention while others are automatic. The manual alternatives include: a) manually initiated from mobile station, b) manually initiated from portal. The automatic alternatives include: c) periodically initiated from mobile station only, d) periodically initiated from network side only (by either centralized address book or portals), e) periodically initiated from both mobile station and from network side (by centralized address book or by portal) if changes occurred to their respective address books or to the subscription status of contacts since the last synchronization, or f) immediately initiated by mobile station or the portal whenever a single contact's information is changed (add/delete/modify) in their respective handset address book. If a user's address book requires frequent updates, then a mobile station initiated periodic sync ('a') may be more efficient than any network initiated periodic sync ('d' or 'e'), because less paging resources are used. It may also be more efficient than the immediate change based trigger (f) as multiple address book changes are communicated during a single synchronization procedure Additionally, a carrier network may manage the triggering method based on traffic load patterns, or other parameters. For example, a mobile station with many contact directory numbers is likely to require frequent subscription status updates compared to a mobile station with few contact directory numbers. Thus, the triggering method may be controlled by the network, and may be a function of the number of contact directory numbers stored on a mobile station or other parameters. Further, a carrier network may reschedule or delay mobile initiated synchronizations to occur during low load periods. The network may exercise this control over the mobile stations during any communication.

As discussed in the examples above, the centralized address book database minimizes the amount of data sent over the network by first obtaining all the local address book changes made in the mobile station(s) and portal(s), and optionally even in the personal computer. For example, see steps S2.2 and S2.3 and S2.4 and S2.7. This allows the centralized address book database to simultaneously obtain subscription status information for all of the changes, and to simultaneously send all of the obtained subscription status information to the mobile station(s) and portal(s). This centralized processing provides many efficiencies.

There are at least three alternatives for periodic synchronization. First alternative, the periodic synchronization is always triggered by the mobile station. The advantage is that less transmission resources may be used than in comparison with the second alternative, but the disadvantage is that there is no simple way for the network to disable or re-schedule the synchronization event.

Second alternative, the periodic synchronization is always triggered by the network side (centralized address book database or portals).

Third alternative, the mobile initiated periodic synchronization occurs only if any mobile address book changes have occurred subsequent to the most recent synchronization. Additionally, network initiated periodic synchronization occurs only if any portal contact database changes or subscription status changes occurred subsequent to the most recent synchronization. This third alternative is relatively efficient with respect to transmissions if address book changes are infrequent but is relatively complex.

There are at least two distinct approaches to sending referral offers. The first approach is "decentralized," and uses the sending mobile station to make decisions and to directly send a referral offer to the target mobile station. This approach reduces transmissions, but requires complex decisions and regular updates at the sending mobile station.

The second approach is "centralized," and the sending mobile station merely sends a referral request to an entity in the carrier's network or hosted by another party on behalf of the carrier, such as the subscription database or the centralized address book database. This intermediate entity makes decisions regarding whether to send a referral offer to the target mobile station. The intermediate entity may consider, for example, whether any referral offers have been recently sent to the target mobile station, and may limit such offers to one per day. It may also populate some or all of the carrier related information in the referral offer message. The referral offer forwarding decisions may be made by the centralized address database, or the subscription status database, or some other third party authorized by the carrier or by the user.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for using a centralized address book database to synchronize and update address books, comprising the steps of:
   a) initiating synchronization and updating of address books;
   b) sending a first local database changes query from the centralized address book database to a mobile station;
   c) receiving a response to the first local database changes query from the mobile station, wherein the response to the first local databases changes query includes any contact information that was added to or changed in the mobile station address book subsequent to the most recent synchronization;
   d) sending a second local database changes query from the centralized address book database to a first portal;
   e) receiving a response to the second local database changes query from the first portal, wherein the response to the second local databases query includes any contact information that was added to or changed in the first portal address book subsequent to the most recent synchronization;
   f) sending a subscription status update request to a subscription database of a carrier providing communication service to the mobile station, wherein the subscription status update request identifies any contact directory number added to the mobile station address book or to the first portal address book subsequent to the most recent synchronization; and
   g) receiving a subscription status update response from the subscription database of the carrier providing communication service to the mobile station, wherein the subscription status update response includes the subscription status with respect to whether or not the carrier provides communication service to a station of any contact directory number added to the mobile station address book or to the first portal address book subsequent to the most recent synchronization;
   h) sending a first local database update to the mobile station, wherein: the first local database update includes any contact information added to or changed in the first portal address book subsequent to the most recent synchronization, and the subscription status with respect to whether or not the carrier provides communication service to a station of any contact directory number added to or changed in the mobile station address book or to the first portal address book subsequent to the most recent synchronization; and
   i) sending a second local database update to the first portal, wherein: the second local database update includes any contact information added to or changed in the mobile station address book subsequent to the most recent synchronization, and the subscription status with respect to whether or not the carrier provides communication service to a station of any contact directory number added to or changed in the mobile station address book or to the first portal address book subsequent to the most recent synchronization.

2. The method of claim 1, wherein:
   i) the address books comprise a mobile station address book associated with the mobile station, and a first portal address book associated with the first portal,
   ii) the address books are associated with a source subscriber having a source directory number for the mobile station, and having a subscription with the carrier for communication service,
   iii) at least one address book contains a contact directory number associated with at least one contact subscription status, and
   iv) the contact subscription status associated with the contact directory number comprises information adequate to determine whether the contact directory number qualifies for benefits or reduced costs from the carrier, when communicating with the mobile station.

3. The method of claim 2, wherein the subscription status update request identifies contact directory numbers changed in the mobile station address book or to the first portal address book subsequent to the most recent synchronization.

4. The method of claim 3, wherein the subscription status update request further identifies contact directory numbers that have not been updated within a predetermined period of time.

5. The method of claim 1, further comprising:
sending a third local database changes query from the centralized address database to a second portal with a second portal address book; and
receiving a response to the third local database changes query from the second portal, wherein the response to the third local databases changes query includes any contact information that was added to the second portal address book subsequent to the most recent synchronization.

6. The method of claim 1, wherein:
the mobile station address book is associated with a mobile group of contacts and has a maximum number of mobile contacts which is based on the mobile station capability,
the first portal address book is associated with a main group of contacts and has a maximum number of main contacts which is based on the first portal capability, and
the mobile group of contacts is a subset of the main group of contacts.

7. The method of claim 6, wherein any new contact added to the first portal address book is by default also added to the mobile station address book until the maximum number of mobile contacts is reached.

8. The method of claim 6, wherein a drag and drop interface allows a user to select one or more contacts and associate the one or more contacts with one or more groups of contacts.

9. The method of claim 1, wherein the initiating the synchronization and updating of address books is triggered by a periodic synchronization request from the mobile station only.

10. The method of claim 1, wherein said initiating synchronization and updating is triggered by a periodic synchronization request from the centralized address book database or portal only.

11. The method of claim 1, wherein said initiating synchronization and updating is triggered by a periodic synchronization request from either the mobile station or any portal only if there are have been changes to their respective address books or changes in subscription status of existing contacts subsequent to the last synchronization.

12. The method of claim 1, wherein said initiating synchronization and updating is immediately triggered by the mobile station or any portal whenever any contactâs information is changed in the respective address book.

13. The method of claim 1, wherein the centralized address book database determines the method of automatic triggering used by the mobile station as a function of traffic load patterns of the mobile station.

14. The method of claim 13, wherein the centralized address book database enables, disables or reschedules the occurrence of subsequent periodic synchronization requests from the mobile station during a previous synchronization event or communication with the mobile.

* * * * *